United States Patent Office 3,539,655
Patented Nov. 10, 1970

3,539,655
SILOXANE-POLYARYLENE POLYETHER COPOLYMERS
Joseph D. Strachan, White Plains, N.Y., and Thomas C. Williams, Ridgefield, Conn., assignors to Union Carbide Corporation, a corporation of New York
No Drawing. Filed Mar. 21, 1968, Ser. No. 714,767
Int. Cl. C08g 47/10
U.S. Cl. 260—824  8 Claims

ABSTRACT OF THE DISCLOSURE

Siloxane-polyarylene polyether copolymers having at least one siloxane chain and at least one polyarylene polyether chain each linked by a carbon to silicon bond or by an aryloxy to silicon bond.

BACKGROUND

This invention relates to organopolysiloxane-polyarylene polyether copolymers.

Polyarylene polyethers are linear thermoplastic polymers having excellent mechanical, physical, chemical, electrical and thermal properties. In general they are characterized as stiff or rigid polymers having high tensile and flexural modulus values. For example, Bakelite (a registered trademark) polysulfone, a commercially available polyarylene polyether, has a tensile modulus (ASTM D-638) of 360,000 p.s.i. and a flexural modulus (ASTM D-790) of 390,000 p.s.i. Because these polymers are relatively stiff, they are susceptible to environmental stress cracking, that is these polymers will fail under stress when exposed to certain environments such as certain organic solvents.

Organopolysiloxanes are well known polymeric materials ranging in viscosity from low molecular weight oils to gums to crosslinked resins. Their physical properties make them suitable for such applications as lubricants, antifoam agents, rubbers and electrical resins.

A novel class of polyarylene polyethersiloxane copolymers has now been discovered that have many of the advantages of each individual polymer without their attendant disadvantages.

SUMMARY

The copolymers of this invention are siloxane-polyarylene polyether copolymers comprising (a) at least one siloxane chain having at least two siloxane units represented by the formula

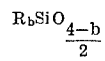

wherein R is a monovalent hydrocarbon group, a divalent organic group or ether oxygen (—O—) and $b$ has a value from 1 to 3 inclusive and (b) at least one linear thermoplastic polyarylene polyether chain composed of recurring units having the formula

wherein E is the residuum of a dihydric phenol and E' is the residuum of a benzenoid compound having an inert electron withdrawing group ortho or para to the valence bonds, both of said residua being valently bonded to the ether oxygens through aromatic carbon atoms. The siloxane chain and the polyarylene polyether chain are linked by a carbon to silicon bond when R is a divalent organic group or by an aryloxy to silicon bond when R is ether oxygen.

DESCRIPTION

Physical mixtures of an organopolysiloxane and a polyarylene polyether have been found to be incompatible. In the copolymers of this invention, this incompatability is overcome.

Thus, the copolymers of this invention are amorphous materials ranging in properties from a more flexible, more stress cracking resistant polyarylene polyether in copolymers of low siloxane content to generally stronger, more durable organopolysiloxanes in the case of copolymers of high siloxane content. Preferred copolymers are linear materials.

The copolymers of this invention are useful per se for the formation of injection moldings, compression moldings, extrusions, film and spray coatings, sealants and adhesives. They can also be used to form latices from which foam or dipped goods may be prepared and in compositions with other polymers.

Crosslinked copolymers have good environmental resistance and are especially useful in moldings and extrusions and especially in wire and cable insulation.

The environmental resistance, especially under stress, to solvents, elevated temperatures and the like, of the copolymers of this invention is greatly enhanced by crosslinking through the vinyl groups by any of several well known methods, for example peroxide, irradiation and the like.

The copolymers of this invention contain from 0.3 to 99 percent by weight of siloxane and from 99.7 to 1 percent by weight of polyarylene polyether.

As stated above the copolymers of this invention contain siloxane chains having at least two siloxane units represented by the formula:

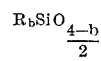

wherein R is a monovalent hydrocarbon group, a divalent organic group (e.g., a divalent hydrocarbon group, a hydroxy-substituted divalent hydrocarbon group or a divalent hydrocarbon group linked to a carbonyl group) or ether oxygen (—O—) and $b$ has a value from 1 to 3 inclusive. Each divalent organic group or ether oxygen links a siloxane chain of the copolymer to a polyarylene polyether chain of the copolymer. The groups represented by R can be the same or different in any given siloxane unit or throughout the siloxane chain of the copolymers and the value of $b$ in the various siloxane units in the siloxane chain of the copolymer can be the same or different. Each siloxane chain of the copolymer contains at least one unit represented by Formula 1 wherein at least one unit represented by R is a divalent organic group or ether oxygen.

Illustrative of the monovalent hydrocarbon groups that are represented by R in Formula 1 are the alkyl groups (for example, the methyl, ethyl, n-propyl, iso-propyl, n-butyl, sec-butyl, isobutyl, t-butyl, n-octyl, decyl, dodecyl groups), the cycloalkyl groups (for example, the cyclopropyl, cyclobutyl, cyclopentyl, cyclohexyl, cycloheptyl groups), the alkenyl groups (for example, the vinyl, allyl, crotyl, 3-butenyl, 1,3-butadienyl, allenyl groups), the cycloalkenyl groups (for example, the cyclopentenyl, cyclohexenyl groups, the alkynyl groups (for example, the ethynyl, propargyl groups), the aryl groups (for example, the phenyl, naphthyl, phenanthrenyl, anthracenyl groups), the aralkyl groups (for example, the benzyl, 2-phenylethyl, 2-phenyl propyl, cumyl groups), the alkaryl groups (for example, the tolyl, t-butyl phenyl, styryl, cyclohexyl phenyl groups). If desired such monovalent hydrocarbon groups can contain substituent functional groups replacing one or more of the hydrogens or carbons of the monovalent hydrocarbon moiety and illustrative of such substituted monovalent hydrocarbon groups are

| | |
|---|---|
| Bromomethyl | —CH₂Br |
| 1-chlorovinyl | —CCl=CH₂ |
| 3,3,3-trifluoropropyl | —CH₂CH₂CF₃ |
| Pentafluoroethoxy ethyl | —CH₂CH₂OCF₂CF₃ |
| 3-chloropropyl | —CH₂CH₂CH₂Cl |
| 3-hydroxypropyl | —CH₂CH₂CH₂OH |
| 3-glycidoxypropyl | —CH₂CH₂CH₂OCH₂CH—CH₂ (with epoxide O) |
| 3-methacryloxy propyl | —CH₂CH₂CH₂OC(=O)—C(CH₃)=CH₂ |
| 2-(t-butoxy)ethyl | —CH₂CH₂OC(CH₃)₃ |
| 2-cyanoethyl | —CH₂CH₂C≡N |
| 3-cyanopropyl | —CH₂CH₂CH₂C≡N |
| 2-aminoethyl | —CH₂CH₂C(=O)—NH₂ |
| 3-(N,N-dimethyl-amido)propyl | —CH₂CH₂CH₂C(=O)—N(CH₃)₂ |
| 3-aminopropyl | —CH₂CH₂CH₂NH₂ |
| 4-aminobutyl | —CH₂CH₂CH₂CH₂NH₂ |
| 3-isocyanatopropyl | —CH₂CH₂CH₂N=C=O |
| 3-carbethoxypropyl | —CH₂CH₂CH₂OC(=O)CH₂CH₃ |
| 2-(p-chlorophenyl)ethyl | —CH₂CH₂—C₆H₄—Cl |
| Dibromophenyl | —C₆H₃Br₂ |
| p-Chloromethylphenyl | —C₆H₄—CH₂Cl |
| Isocyanatophenyl | —C₆H₄—N=C=O |
| m-Nitrophenyl | —C₆H₄—NO₂ |
| p-Aminophenyl | —C₆H₄—NH₂ |
| p-Hydroxyphenyl | —C₆H₄—OH |

The structure of the divalent organic group represented by R in Formula 1 is dependent upon the type of reaction involved in producing the siloxane-polyarylene polyether copolymer. The copolymers can be produced by any number of reactions thereby giving rise to a variety of divalent organic groups linking the siloxane chain to the polyarylene polyether chain of the copolymer. Typical of such reactions showing only the reactive groups of the siloxane and polyarylene polyether chains and the resulting link are the following:

$$\equiv SiOR' + HOC\equiv \longrightarrow \equiv SiOC\equiv + R'OH$$
$$\equiv SiOC(=O)R' + HOC\equiv \longrightarrow \equiv SiOC\equiv + HOC(=O)R'$$
$$\equiv SiH + HOC\equiv \longrightarrow \equiv SiOC\equiv + H_2$$
$$\equiv SiY + HOC\equiv \longrightarrow \equiv SiOC\equiv + HY$$
$$\equiv SiOH + HOC\equiv \longrightarrow \equiv SiOC\equiv + H_2O$$
$$\equiv Si(CH_2)_3OCH_2CH\overset{O}{-}CH_2 + HOC\equiv \longrightarrow \equiv Si(CH_2)_3OCH_2CHCH_2OC\equiv$$
$$\hspace{6cm} |$$
$$\hspace{6cm} OH$$
$$\equiv SiH + CH_2=CHCH_2OC\equiv \longrightarrow \equiv Si(CH_2)_3OC\equiv$$
$$\equiv SiR''X + MOC\equiv \longrightarrow SiR''OC\equiv + MX$$

In the above equations, R' represents a monovalent alkyl or aryl group, Y represents a halogen atom or amino group, such as —NH₂, —NHZ, and —NZ₂ wherein Z is a monovalent hydrocarbon radical, X represents a halogen atom, i.e. bromine, chlorine, fluorine or iodine, M is an alkali metal such as sodium or potassium and R'' is a divalent hydrocarbon radical, preferably a saturated aliphatic radical such as methylene, ethylene, propylene, n-butylene, isoamylene, hexamethylene and the like.

In addition, many other reactive groups can replace those shown in the above equations on either the siloxane or polyarylene polyether chains for example on the siloxane chain:

$$\equiv SiM$$
$$\equiv Si—OM$$
$$\equiv Si—ON=CR'_2$$
$$\equiv Si—NHC(=O)R'$$
$$\equiv Si—N(R^3)C(=O)R'$$
$$\equiv Si—SR'$$
$$\equiv Si—OPR'_2$$
$$\equiv Si—RNH_2$$
$$\equiv Si—RNHR'$$
$$\equiv Si—RCH\overset{O}{-\!-\!-}CH_2$$
$$\equiv Si—R''C(=O)—H$$
$$\equiv Si—R''C(=O)—OH$$
$$\equiv Si—R''C(=O)—OM$$
$$\equiv Si—R''C(=O)—X$$
$$\equiv Si—R''OC(=O)—X$$
$$Si—R''SH$$
$$\equiv Si—R''SM$$
$$\equiv Si—R''—OH$$
$$\equiv Si—R''—OM$$
$$\equiv Si—R''—N=C=O$$

and for example on the polyarylene polyether chain;

$$X—C\equiv$$
$$HC(=O)—C\equiv$$
$$HOC(=O)—C\equiv$$
$$MOC(=O)—C\equiv$$
$$X—C(=O)—C\equiv$$
$$X—CO—C\equiv$$
$$O=C=N—C\equiv$$
$$H_2N—C\equiv$$
$$R'HN—C\equiv$$
$$HO_3S—C\equiv$$
$$MO_3S—C\equiv$$
$$CH_2=CHO—C\equiv$$
$$CH_2—CHR''—C\equiv$$
$$CH_2=CHR''O—C\equiv$$
$$HS—C\equiv$$
$$MS—C\equiv$$
$$HO—N=C\equiv$$
$$X—R''—C\equiv$$
$$XMgR''—C\equiv$$
$$XMgO—C\equiv$$

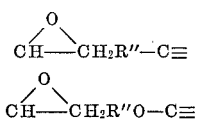

wherein R', R", X and M are as defined previously. Appropriately selected pairs of the foregoing reactive groups can be reacted to copolymerize the siloxane and polyarylene polyether chains.

Illustrative of the divalent hydrocarbon groups represented by R in formula 1 are the alkylene groups (such as the methylene, ethylene, propylene, butylene, 2,2-dimethyl-1,3-propylene and decylene groups), the arylene groups (such as the p-pheneylene and p,p'-diphenylene groups) and the alkarylene groups (such as the phenylmethylene and phenylethylene groups). Preferably, the divalent hydrocarbon groups are alkylene groups containing from two to four successive carbons, p-phenylene groups, and phenylmethylene groups. Siloxane units containing divalent hydrocarbon groups as substituents are illustrated by groups having the formulae:

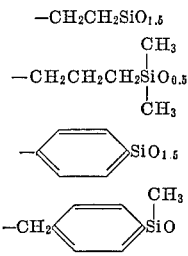

These divalent hydrocarobn groups are linked to a silicon atom of the siloxane chain of the copolymer by a silicon-to-carbon bond.

The copolymers can contain siloxane units represented by Formula 1 wherein either the same hydrocarbon groups are attached to the silicon atoms (e.g., the dimethylsiloxy, diphenylsiloxy and diethylsiloxy groups) or different hydrocarbon groups are attached to the silicon atoms (e.g., the methylphenylsiloxy, methylvinylsiloxy, bromomethyldimethylsiloxy, meta - aminophenyldimethylsiloxy and the ethylphenylvinylsiloxy groups). These copolymers can contain one or more types of siloxane units that are represented by Formula 1 provided that at least one group has at least one divalent hydrocarbon substituent. By way of illustration, only p-phenylene dimethylsiloxy groups

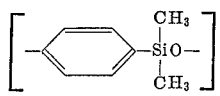

can be present in the siloxane chain or the copolymer can contain more than one type of siloxane units, e.g., the copolymer can contain both p-phenylenedimethylsiloxy units and diphenylsiloxy units or the copolymer can contain p - phenylene dimethylsiloxy units, diphenylsiloxy units, dimethylsiloxy units and methylvinylsiloxy units. The copolymers can contain trifunctional siloxane units (e.g., monomethylsiloxane groups, $CH_3SiO_{1.5}$), difunctional siloxane units (e.g., dimethylsiloxane units, $(CH_3)_2SiO$—), monofunctional siloxane units (e.g. bromomethyl dimethylsiloxane units, $BrCH_2(CH_3)_2SiO_{0.5}$), or combinations of these types of siloxane units having the same or different substituents. According to the average functionability of the siloxane units, the siloxane chain can be predominantly linear, cyclic, branched or cross-linked or can have combinations of these structures. Preferably the siloxane chains of the copolymers are linear or predominantly linear having small amounts of branching.

The residua, E and E' in Formula 2 are characterized as stated above since they are conveniently prepared by the reaction of an alkali metal double salt of a dihydric phenol and a dihalobenzenoid compound having an electron withdrawing group as is described more fully herein.

The residuum E of the dihydric phenol can be, for instance, a mononuclear phenylene group as results from hydroquinnone and resorcinol, or it may be a di- or polynuclear residuum. The residuum E can also be substituted with other inert nuclear substituents such as halogen, alkyl, alkoxy and link inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols," such as, for example, the 2,2-bis(4-hydroxyphenyl)propane, 1,1-bis- (4-hydroxyphenyl) - 2-phenylethane, bis-(4 - hydroxyphenyl)methane, or the chlorinated derivatives containing one or two chlorines on each aromatic ring. Other suitable dinuclear dihydric phenols are the bisphenols of a symmetrical or unsymmetrical joining group as, for example, either oxygen (—O—), carbonyl (—CO—), sulfide (—S—), sulfone (—SO₂—), or hydrocarbon residue in which the two phenolic nuclei are joined to the same or different carbon atoms of the residue such as, for example, the bisphenol of acetophenone, the bisphenols of benzophenone, the bisphenol of vinyl cyclohexene, the bisphenol of alphapinene, and the like bisphenols where the hydroxyphenyl groups are bound to the same or different carbon atoms of an organic linking group.

Such dinuclear phenols can be characterized as having the structure:

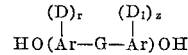

wherein Ar is an aromatic group and preferably is a phenylene group, D and $D_1$ can be the same or different inert substituent groups as alkyl groups having from 1 to 4 carbon atoms, halogen atoms, i.e. fluorine, chlorine, bromine, or iodine, or alkoxy radicals having from 1 to 4 carbon atoms, r and z are integers having a value of from 0 to 4, inclusive, and G is representative of a bond between aromatic carbon atoms as in dihydroxydiphenyl, or is a divalent radical, including for example, inorganic radicals as —CO—, —O—, —S—, —S—S—, —SO₂—, and divalent organic hydrocarbon radicals such as alkylene, alkylidene, cycloaliphatic, or the halogen alkyl, aryl or like substituted alkylene, alkylidene and cycloaliphatic radicals as well as alkalicyclic, alkarylene and aromatic radicals and a ring fused to both Ar groups.

Examples of specific dihydric polynuclear phenols include among others: the bis-(hydroxyphenyl)alkanes such as 2,2-bis-(4-hydroxyphenyl)propane,
2,4'-dihydroxydiphenyl-methane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis(2-isopropyl-4-hydroxyphenyl)propane,
2,2-bis-(4-hydroxynapthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenylpropane,
2,2-bis-(4-hydroxyphenyl)-1,1,1,3,3,3-hexafluoropropane
and the like;

Di(hydroxyphenyl)sulfones such as bis-(4-hydroxyphenyl)sulfone, 2,4' - dihydroxydiphenyl sulfone, 5' - chloro-2,4'-dihydroxydiphenyl sulfone, 5'-chloro-4,4'-dihydroxydiphenyl sulfone, and the like;

Di(hydroxyphenyl)ethers such as bis - (4 - hydroxyphenyl)ether, the 4.3'-, 4,2'-, 2,3'-dihydroxydiphenyl ethers, 4,4(-dihydroxy-2,6-dimethyldiphenyl ether,
bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether,
4,4'-dihydroxy-3,6-dimethoxydiphenyl ether,
4,4'-dihydroxy-2,5-diethoxydiphenyl ether, and like materials.

It is also contemplated to use a mixture of two or more different dihydric phenols to accomplish the same ends as above. Thus when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus, it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzenoid compounds. Preferred are the strong activating groups such as the sulfone groups (—SO$_2$—) bonding two halogen substituted benzenoid nuclei as in the 4,4'-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev., 49, 273 (1951) and Quart. Rev., 12, 1 (1958).

The electron withdrawing group of the dihalobenzenoid compound can function either through the resonance of the aromatic ring, as indicated by those groups having a high sigma* value, i.e., above about +0.7 or by induction as in perfluoro compounds and like electron sinks.

Preferably the activating group should have a high sigma* value, preferably above 1.0, although sufficient activity is evidenced in those groups having a sigma* value above 0.7.

The activating group can be basically either of two types:

(a) Monovalent groups that activate one or more halogens on the same ring as a nitro group, phenylsulfone, or alkylsulfone, cyano, trifluoromethyl, nitroso, and hetero nitrogen as in pyridine.

(b) Divalent groups which can activate displacement of halogens on two different rings, such as the sulfone group —SO$_2$—; the carbonyl group —CO—; the vinyl group —CH=CH—; the sulfoxide group —SO—; the azo group —N=N—; the saturated fluorocarbon groups —CF$_2$—CF$_2$—; organic phosphine oxides.

where Q is a hydrocarbon group, and the ethylidene group

where X can be hydrogen or halogen or which can activate halogens on the same ring as with difluorobenzoquinone, 1,4- or 1,5- or 1,8-difluoroanthraquinone.

If desired, the polymers may be made with mixtures of two or more dihalobenzenoid compounds each of which has this structure, and which may have different electron withdrawing groups. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atoms on the benzenoid nucleus.

From the foregoing, it is evident that preferred linear thermoplastic polyarylene polyethers are those wherein E is the residuum of a dinuclear dihydric phenol and E' is the residuum of a dinuclear benzenoid compound. These preferred polymers then are composed of recurring units having the formula

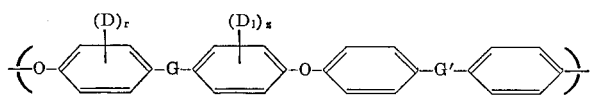

wherein G represents a number of the group consisting of a bond between aromatic carbon atoms and a divalent connecting radical and G' represents a member of the group consisting of sulfone, carbonyl, vinyl, sulfoxide, azo, saturated fluorocarbon, organic phosphine oxide and ethylidene groups and D and D$_1$ each represent inert substituent groups selected from the group consisting of halogen, alkyl groups having from 1 to 4 carbon atoms and alkoxy groups having from 1 to 4 carbon atoms and where r and z are integers having a value from 0 to 4 inclusive. Even more preferred are the thermoplastic polyarylene polyethers of the above formula wherein r and z are zero, G is divalent connecting radical

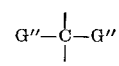

wherein G'' represents a member of the group consisting of hydrogen, lower alkyl, lower aryl, and the halogen substituted groups thereof, and G' is a sulfone group.

Thermoplastic polyarylene polyethers described herein can be prepared in a substantially equimolar one-step reaction of a double alkali metal salt of a dihydric phenol with a dihalobenzenoid compound in the presence of specific liquid organic sulfoxide or sulfone solvents under substantially anhydrous conditions. Any alkali metal salt of the dihydric phenol can be used as the one reactant.

Thermoplastic polyarylene polyethers described herein can also be prepared in a two-step process in which a dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds. The preparation of a specific polyarylene polyether is detained in Example 1 below and the one-step and two-step processes referred to above are described in detail in U.S. Pat. 3,264,536, issued Aug. 2, 1966.

In preparing the polyarylene polyether chains for use in this invention, the reactive groups —OM or —X, where M and X are as defined above, can be placed at each end of the polymer chain by using a molar excess of dihydric phenol in the case of —OM groups or a molar excess of dihalobenzenoid compound in the case of —X groups. These reactive groups can be reacted directly with reactive groups on the siloxane chain as indicated above or first reacted with a compound which introduces a different reactive group onto the polymer chain which can then be reacted with the reactive groups on the siloxane chain also as indicated above. The molecular weight of the polyarylene polyether chains can be controlled by varying the amounts of starting monomers and/or using a chain terminator such as methyl chloride.

Glass transition temperature ($T_g$), commonly referred to as the second order phase transition temperature, refers to the inflection temperatures found by plotting the resilience (recovery from one percent elongation) of a film ranging in thickness from 3 to 15 mils against the temperature. See Brown, Textile Research Journal, 25, 891 (1955).

Reduced viscosity (RV) is determined by dissolving a 0.2 gram sample of polymer in chloroform in a 100 ml. volumetric flask so that the resultant solution measures exactly 100 ml. at 25° C. in a constant temperature bath. The viscosity of 3 ml. of the solution which has been filtered through a sintered glass funnel is determined by a viscometer at 25° C. Reduced viscosity values are obtained from the equation:

$$\text{Reduced Viscosity} = \frac{t_s - t_o}{c \cdot t_o}$$

wherein:

$t_o$ is the efflux time of the pure solvent
$t_s$ is the efflux time of the polymer solution
$c$ is the concentration of the polymer solution expressed in terms of grams of polymer per 100 ml. of solution The following examples are intended to further illustrate this invention without limiting the same in any manner. All parts and percentages are by weight unless indicated otherwise.

EXAMPLE 1

A 500 ml., Pyrex, 3-neck round bottom flask is equipped with a heating mantle and, in the center opening, a motor-driven, glass blade agitator. One side neck contains a combination thermometer well and gas inlet tube for purge-flow nitrogen. On the third neck is a glass Y-type adapter and hereon are placed a dropping funnel with stopcock and an 8-plate distillation column, packed with glass helices and surmounted by a take-off head connected to a graduate cylinder receiver and containing a water-cooled cold finger condenser.

When the apparatus has been purged with $N_2$, there is charged to the flask 10.7 grams sodium hydroxide pellets (0.26 moles NaOH) and 10.6 grams distilled water. These are agitated to effect solution. Then are added to the agitating mixture in the flask, 50 grams of monochlorobenzene, 65 grams of dry dimethylsulfoxide and 30.0 grams of 2,2-bis(4-hydroxyphenyl)- propane (bisphenol A) (0.132 moles) with another 50 grams of monochlorobenzene to complete washing in of the other materials. This mixture is heated to reflux at 120° C. and held at 110–115° C. for 1 hour. After the flask contents have cooled to 30° C. in 2 hours, there is added 34.32 grams of 4,4'-dichlorodiphenyl sulfone (0.12 moles), washed in with 100 grams of monochlorobenzene. Heating is resumed and, when the flask temperature reaches 134° C., the azeotrope of water and monochlorobenzene appear at the still head. Azeotrope is taken over into the receiver for 1½ hours by which time the flask temperature reaches 170° C. The flask contents are allowed to cool to 150° C. whereupon heat input is resumed and the temperature is held at 150° C. for ½ hour. The overhead takeoff totals 191.2 grams of which the separate aqueous phase was 16.5 grams. After cooling, the agitation is stopped and the flask contents, still under $N_2$ purge are left overnight. About 16 hours later, the dark brown, viscous flask contents are agitated and 4.079 grams of bis(bromomethyl) tetramethyldisiloxane (0.012 mole) are added. The mix is agitated 1 hour and 109.2 grams of monochlorobenzene are added. The flask contents are heated to 110° C. under total reflux (that is, no takeoff) and held at 105–110° C. for 1½ hours. The flask contents are cooled to 45° C., and filtered through a glass frit using a total of 500 grams of monochlorobenzene to dilute the mix and to rinse out the flask.

The filtrate is clear and colored and is charged back to the same reaction setup and agitated and heated to reflux at 134° C. After 1 hour at total reflux, with no visible condensate at the still head, heat input is increased until there was a good reflux and a slow takeoff is begun and the flask temperature maintained at 150° C. for 1 hour, a total of 256 grams taken off overhead. These flask contents are diluted with 265 grams monochlorobenzene and coagulated by adding to 1240 cc. of rapidly agitating ethanol. Agitation is continued 1 hour and the polymer, which settles rapidly, leaves an almost clear supernate and is separated by suction filtration through a coarse glass frit. The polymer is washed with ethanol and dried in a vacuum oven at 5–10 mm. Hg absolute pressure at 120° C. for 1 hour. The dried polymer weighed 29.0 grams, has a reduced viscosity of 0.45, a silicon content of 0.9±0.3% (calculated, 1.17%) and infrared spectroscopic analysis shows siloxane and hydroxy.

The copolymer contains about 3% silicon and has a $T_g$ of 160° C. The siloxane chain of the copolymer has a molecular weight of 148 and the polyarylene polyether chain a molecular weight of 4648.

EXAMPLE 2

A copolymer containing more silicone is made in the same manner as Example 1 except for the proportions of materials. The weight of bisphenol A is kept at 30.0 grams (0.132 mole) but the 4,4'-dichlorodiphenylsulfone is reduced to 28.3 grams (0.99 mole) and bis(bromomethyl) tetramethyldisiloxane correspondingly increased to 10.53 grams (0.033 mole). After the addition of bis(bromomethyl) tetramethyldisiloxane, the flask contents are agitated one hour, 50 grams chlorobenzene are added and agitation continued for three hours. Then the flask contents are heated to 147° C. (with no takeoff) for one hour. Then chlorobenzene is taken off at a slow regulated takeoff for 1 hour as the flask temperature rises to 160° C. The flask is allowed to cool at 150° C. (in ¼ hour) and held at 150° C. for ¼ hour. At room temperature, the flask contents are viscous and solid-like. Chlorobenzene is used to slurry the contents and about one-half of the material was decanted from the flask. The polymer in the decantate is coagulated by pouring the clear, colored filtrate into 720 ml. ethanol and the coagulate separated by filtration, washed with ethanol and dried in a vacuum oven at 120° C. at 5–10 mm. Hg absolute pressure for 2 hours. The copolymer weighed 21 grams, contains 3.2±0.3% silicon (calculated, 3.25%) and a reduced viscosity (0.2 gram in 100 ml. $CHCl_3$) of 0.23. Infrared spectroscopic analysis showed the presence of much siloxane and little, if any, hydroxyl.

The copolymer contains about 0.9% silicone and has a $T_g$ of 185° C. The siloxane chain of the copolymer has a molecular weight of 148 and the polyarylene polyether chain a molecular weight of 4648.

EXAMPLE 3

The polyarylene polyether chain is prepared as described in Example 1 up to the point where the material has been refluxed for 1 hour at 150° C., leaving in the flask a sodium phenate terminated linear polymer. The flask contents are allowed to cool to 40° C. and there is added 41.8 grams of a

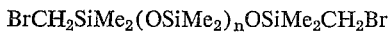
BrCH$_2$SiMe$_2$(OSiMe$_2$)$_n$OSiMe$_2$CH$_2$Br fluid which had been prepared by adding to distilled BrCH$_2$SiMe$_2$Cl linear KOSiMe$_2$(OSiMe$_2$)K prepared from KOH and (Me$_2$SiO)$_4$. This bromomethyl endblocked fluid is analyzed for bromine and found to contain 12.2±0.4% indicating the average value of $n$ to be about 13. The agitating contents are heated to total reflux at 145° C. for 1 hour. A still head is then affixed atop the column and about 30 ml. of distillate slowly collected in another 2 hours with the flask temperature held at 150° C. The flask contents are cooled to room temperature and 420 grams chlorobenzene used to empty the flask and filter the contents. The polymer is separated from the filtrate by adding it to agitating ethanol. The solids are dried in a vacuum oven at 110° C., about 5 mm. Hg absolute pressure for 1 hour. The product is a firm, white, gum with a silicon content of 11.5%. The siloxane chain of the copolymer has a molecular weight of 1252 and the polyarylene polyether chain a molecular weight of 1554.

EXAMPLE 4

To the 500 ml. flask employed in Example 1 are charged 10.8 grams sodium hydroxide (0.27 mole NaOH), 22.8 grams (0.10 mole) bisphenol A, 92 grams N-methylacetamide and 200 grams toluene. A toluene-methanol azeotrope and toluene are distilled out at 150° C. for 1 hour under nitrogen followed by cooling to 60° C. after which 21.5 (0.075 mole) grams of 4,4'-dichlorodiphenylsulfone, 100 ml. toluene and 100 ml. chlorobenzene are added and the reaction mixture is heated to 160° C. After ½ hour, 50 ml. chlorobenzene are added followed by distillation at 160° C. for ½ hour. The reaction mass is cooled to 30° C. and 15.3 grams allyl chloride are added followed by heating at 150° C. for ¼ hour. After 16 hours the reaction mass is diluted with 100 ml. of chlorobenzene containing 7.65 grams of allyl chloride. The reaction product, the diallyl ether of the sodium phenate terminated condensation polymer of bisphenol A and 4,4'-dichlorodiphenylsulfone, is precipitated by adding 1900 ml. ethanol and filtered. After drying at 100° C. at 1 mm. Hg for 1 hour, 53.5 grams of this product are charged to a 5 liter flask with 1340 grams toluene. While heating at reflux under nitrogen, water and 30 ml. toluene are removed. After cooling to 68° C., 366.9 grams of

HSiMe$_2$(Me$_2$SiO)$_n$SiMe$_2$H containing 4 ml. hydrolyzable hydrogen per gram and wherein average $n$ equals about 145, 200 ml. toluene and 22 ml. of a benzene solution of ethylene platinum chloride containing 25 p.p.m. Pt metal as a catalyst are added. The mixture is heated to 100° C. for ½ hour, cooled and stirred overnight. The product was precipitated, filtered, desolvated and dried.

The copolymer contains about 32% silicon. The siloxane chain of the copolymer has a molecular weight of about 10700 and the polyarylene polyether chain a molecular weight of 1520.

EXAMPLE 5

Example 1 is duplicated using a sodium phenate terminated polyarylene polyether prepared as in Example 1 from 4,4'-dichlorodiphenyl sulfone and a molar excess of 4,4'-dihydroxydiphenyl sulfone and bis(bromomethyl) tetramethyldisiloxane. The siloxane chain of the copolymer has a molecular weight of 148 and the polyarylene polyether chain a molecular weight of 4890.

EXAMPLE 6

Example 2 is duplicated using a chlorine terminated polyarylene polyether prepared as in Example 1 from the 4,4'-bisphenol of benzophenone and a molar excess of 4,4'-dichlorodiphenyl sulfone and bis(bromomethyl)tetramethyldisiloxane. The siloxane chain of the copolymer has a molecular weight of 148 and the polyarylene polyether chain a molecular weight of 5120.

EXAMPLE 7

Example 2 is duplicated using a sodium phenate terminated polyarylene polyether prepared as in Example 1 from 4,4'-dichlorodiphenyl sulfone and a molar excess of the 4,4'-bisphenol of vinyl cyclohexene (prepared by an acid catalyzed condensation of 2 moles of phenol with one mole of vinyl cyclohexene) and bis(bromomethyl) tetramethyldisiloxane. The siloxane chain of the copolymer has a molecular weight of 148 and the polyarylene polyether chain a molecular weight of 5978.

EXAMPLE 8

Example 2 is duplicated using a sodium phenate terminated polyarylene polyether prepared as in Example 1 from 4,4'-difluorodiphenylbenzophenone and a molar excess of hydroquinone and bis(bromomethyl)tetramethyldisiloxane. The siloxane chain of the copolymer has a molecular weight of 148 and the polyarylene polyether chain a molecular weight of 2620.

EXAMPLE 9

To a 1000 ml. flask is charged 30.0 grams (0.132 mole) 2,2-(p-hydroxyphenyl)propane, 14.3 grams of sodium methoxide, 100 grams N-methyl acetamide and 250 grams toluene. After purging with N$_2$ the mixture is heated to 150° C. and 50 ml. of distillate taken off. The mixture is then held at 150° C. under total reflux for 1 hour and then cooled to about 70° C. To the mixture is added 25.3 grams (0.088 mole) 4,4'-dichlorodiphenyl sulfone and 200 ml. chlorobenzene. The mixture is heated until 50 ml. of distillate is taken off and then cooled to 30° C. To the mixture is added 53.0 grams of a bromomethyl terminated polysiloxane having the nominal composition

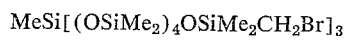
MeSi[(OSiMe$_2$)$_4$OSiMe$_2$CH$_2$Br]$_3$ prepared by the cohydrolysis of 225 (1.5 moles) grams MeSiCl$_3$, 2322 grams (18.0 moles) Me$_2$SiCl$_2$ and 1044 grams (4.5 moles) of BrCH$_2$Me$_2$SiBr. The mixture is heated at 100° C. for 1 hour until a just noticeable increase in viscosity has occurred. At this point the mixture is cooled to 30° C. and filtered through a glass. About 20 ml. of the filtrate is poured into a glass Petri dish and heated at 100° C. for 2 hours to remove solvent. At the end of that time, a transparent flexible film of resinous polymer is removed from the glass dish and placed on a smooth surface block of polytetrafluorethylene. The film and block are heated in an oven for 1 hour at 150° C. plus 1 hour at 200° C. plus 1 hour at 250° C. After cooling to room temperature the film is clear and hard and can be folded 180° upon itself without rupture.

EXAMPLE 10

To a 100 ml. flask is charged 30.0 grams (0.132 mole) 2,2-(p-hydroxyphenyl)propane, 14.3 grams sodium methoxide, 100 grams N-methyl acetamide 230 grams toluene. The system is purged with N$_2$ and the mixture heated to 150° C. while distilling over toluene-methanol azeotrope and then pure toluene. After holding at 150° C. for 1 hour, the mixture is cooled to about 75° C. and 25.3 grams (0.088 mole) 4,4'-dichlorodiphenyl sulfone is washed in with 250 ml. chlorobenzene. The mixture is heated to about 160° C. to distill over about 50 ml. of solvent and then cooled to 30° C. An excess of allyl chloride (30 grams) is added, the mixture heated to 150° C. for ½ hour, cooled to 30° C., and filtered. The mixture is added to 3 liters of agitated methanol and the precipitated oligomer filtered off and redissolved in 2 liters of toluene in a 5000 ml. flask. The solution is heated to distill over water-toluene azeotrope plus 150 ml. toluene and then cooled to 50° C. To the mixture are added 750 grams of a hydride terminated dimethyl silicone oligomer of the type

having a hydrolyzable hydrogen content of 294 ml. hydrogen per gram and a molecular weight of about 7500 along with 250 ml. toluene and 25 parts platinum per million parts silicone oligomer as a solution of chloroplatinic acid in diethylene glycol dimethyl ether. The mixture is heated to 100° C. for 1 hour and then cooled to 30° C. To the mixture are added 1 gram of absorptive carbon and 5 grams filter grade deatomaceous earth. After stirring for ¼ hour the mixture is filtered on a suction filter. The mixture is then desolvated in an evaporator at 150° C. and 1 mm. Hg absolute pressure. The product is 673 grams of an opalescent fluid having a viscosity of about 850 centipoises at 30° C.

What is claimed is:

1. Siloxane-polyarylene polyether copolymer comprising (A) at least one siloxane chain having at least two siloxane units represented by the formula:

wherein R is a monovalent hydrocarbon group, a substituted monovalent hydrocarbon group wherein each substituent is a halogen atom, an oxygen atom of an epoxy group or a hydroxy, cyano, alkoxy, amino, amido, isocyanato, nitro, or ester group, a divalent organic group and $b$ has a value from 1 to 3 inclusive, said siloxane chain containing at least one of said siloxane units wherein at least one R is a divalent organic group which links the siloxane chain to a polyarylene polyether chain by a carbon to silicon bond and (B) at least one linear thermoplastic polyarylene polyether chain composed of recurring units having the formula:

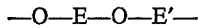

wherein E is the residuum of a dihydric phenol and E' is the residuum of a benzenoid compound having an inert election with drawing group having a sigma* value above about +0.7 ortho or para to the valence bonds, both of said residua being valently bonded to the ether oxygens through aromatic carbon atoms.

2. Copolymer of claim 1 wherein said siloxane chain is linear.

3. Copolymer of claim 1 wherein said siloxane chain is polydimethylsiloxane.

4. Copolymer of claim 1 wherein said polyarylene polyether chain is composed of recurring units having the formula

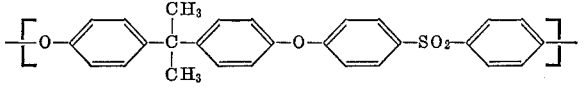

5. Copolymer of claim 1 wherein said polyarylene polyether chain is composed of recurring units having the formula

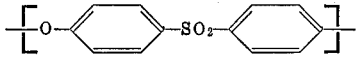

6. A copolymer as claimed in claim 1 wherein at least one group represented by R is a substituted monovalent hydrocarbon group wherein each substituent is a halogen atom.

7. A copolymer as claimed in claim 1 wherein at least one group represented by R is a 3,3,3-trifluoropropyl group.

8. A copolymer as claimed in claim 1 wherein each group represented by R is a monovalent hydrocarbon group or a divalent organic group.

References Cited

UNITED STATES PATENTS

| | | | |
|---|---|---|---|
| 3,063,872 | 11/1962 | Boldebuck | 260—824 |
| 3,402,143 | 9/1968 | Hay | 260—824 |
| 3,417,053 | 12/1968 | Chalk | 260—824 |
| 3,423,479 | 1/1969 | Hendricks | 260—824 |

SAMUEL H. BLECH, Primary Examiner

U.S. Cl. X.R.

117—161; 260—2.5, 29.6, 46.5, 47, 49, 448.2